(12) United States Patent
Oh

(10) Patent No.: US 11,706,131 B2
(45) Date of Patent: Jul. 18, 2023

(54) INFORMATION PROCESSING APPARATUS, INFORMATION PROCESSING SYSTEM, AND INFORMATION PROCESSING METHOD

(71) Applicant: Iha Oh, Kanagawa (JP)

(72) Inventor: Iha Oh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/456,909

(22) Filed: Nov. 30, 2021

(65) Prior Publication Data

US 2022/0182312 A1 Jun. 9, 2022

(30) Foreign Application Priority Data

Dec. 7, 2020 (JP) ................................ 2020-202544

(51) Int. Cl.
*H04L 45/30* (2022.01)
*H04L 41/14* (2022.01)

(52) U.S. Cl.
CPC ............ *H04L 45/30* (2013.01); *H04L 41/145* (2013.01)

(58) Field of Classification Search
CPC ........ H04L 45/30; H04L 41/145; H04L 69/18
See application file for complete search history.

(56) References Cited

U.S. PATENT DOCUMENTS

| 7,827,261 B1* | 11/2010 | Griswold, Jr. | .......... | H04L 69/18 |
| | | | | 709/223 |
| 2002/0124094 A1* | 9/2002 | Chang | ..................... | H04L 43/00 |
| | | | | 709/230 |
| 2009/0193133 A1* | 7/2009 | Torii | ....................... | H04L 69/24 |
| | | | | 709/230 |
| 2013/0198329 A1 | 8/2013 | Wang | | |
| 2013/0198357 A1 | 8/2013 | Wang | | |
| 2014/0279264 A1 | 9/2014 | Wang | | |
| 2015/0081889 A1 | 3/2015 | Wang | | |
| 2015/0236899 A1* | 8/2015 | Sengupta | .............. | G06F 3/0482 |
| | | | | 715/736 |
| 2015/0261484 A1 | 9/2015 | Wang | | |
| 2016/0020960 A1 | 1/2016 | Wang | | |
| 2019/0312839 A1* | 10/2019 | Grimm | ................... | H04L 63/20 |

FOREIGN PATENT DOCUMENTS

JP 2020-135248 8/2020

OTHER PUBLICATIONS

Extended European Search Report for 21211510.9 dated May 2, 2022.

* cited by examiner

*Primary Examiner* — John A Follansbee
*Assistant Examiner* — Fadi Haj Said
(74) *Attorney, Agent, or Firm* — IPUSA, PLLC

(57) ABSTRACT

An information processing apparatus is communicable with an electronic apparatus according to a plurality of protocols. The information processing apparatus includes circuitry. The circuitry identifies a particular protocol supported by the electronic apparatus among the plurality of protocols. The circuitry determines a management type based on the identified particular protocol. The circuitry sets a communication path through which the electronic apparatus communicates with a management apparatus based on the determined management type.

4 Claims, 7 Drawing Sheets

FIG. 5B

| DEVICE ID | IP ADDRESS | MAC ADDRESS | MODEL NAME | VENDOR NAME | FIRST PROTO-COL | SECOND PROTO-COL | THIRD PROTO-COL | MANAGEMENT TYPE | COMMUNICATION DESTINATION |
|---|---|---|---|---|---|---|---|---|---|
| A01 01234567 | 11.22.33.44 | 02-02-01-23-45-67 | AAA 0101 | Super AAA | TRUE | FALSE | FALSE | Type-A | null |
| B0201234567 | 22.33.44.55 | 03-03-01-23-45-67 | XYZ 0202 | Big XYZ | TRUE | FALSE | TRUE | Type-B | 11.22.55.66 |
| MAC0101101234567 | 33.44.55.66 | 01-01-01-23-45-67 | UVW 0303 | Extra UVW | FALSE | TRUE | TRUE | Type-C | 133.139.1.2 |
| ... | ... | ... | ... | ... | ... | ... | ... | ... | ... |

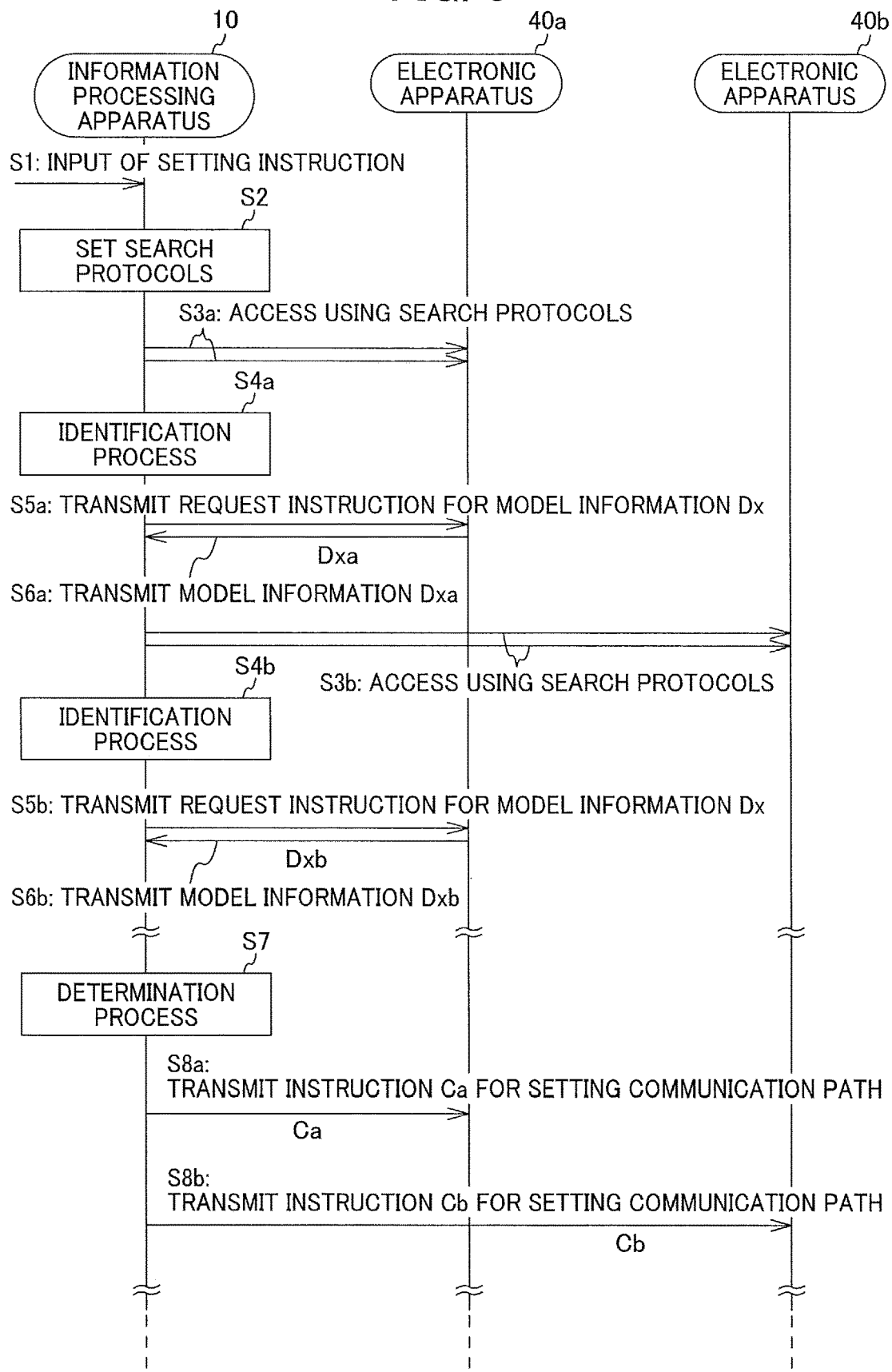

INFORMATION PROCESSING APPARATUS, INFORMATION PROCESSING SYSTEM, AND INFORMATION PROCESSING METHOD

CROSS-REFERENCE TO RELATED APPLICATIONS

This patent application is based on and claims priority pursuant to 35 U.S.C. § 119(a) to Japanese Patent Application No. 2020-202544, filed on Dec. 7, 2020, in the Japan Patent Office, the entire disclosure of which is hereby incorporated by reference herein.

BACKGROUND

Technical Field

Embodiments of the present disclosure relate to an information processing apparatus, an information processing system, and an information processing method.

Related Art

A technology is known that manages a plurality of electronic apparatuses by a management apparatus. According to the known technique, the electronic apparatus communicates with the management apparatus using a predetermined protocol.

Conventionally, an operation for setting a communication path through which the electronic apparatus communicates with the management apparatus has to be performed according to a protocol that the electronic apparatus supports. Examples of the communication path to be set include, but are not limited to, whether a specific relay apparatus intervenes between the electronic apparatus and the management apparatus.

SUMMARY

An embodiment of the present disclosure includes an information processing apparatus communicable with an electronic apparatus according to a plurality of protocols. The information processing apparatus includes circuitry. The circuitry identifies a particular protocol supported by the electronic apparatus among the plurality of protocols. The circuitry determines a management type based on the identified particular protocol. The circuitry sets a communication path through which the electronic apparatus communicates with a management apparatus based on the determined management type.

Another embodiment of the present disclosure includes an information processing system including an information processing apparatus and a management apparatus that communicates with an electronic apparatus. The information processing apparatus is communicable with the electronic apparatus according to a plurality of protocols and includes circuitry. The circuitry identifies a particular protocol supported by the electronic apparatus among the plurality of protocols. The circuitry identifies determines a management type based on the identified particular protocol. The circuitry sets a communication path through which the electronic apparatus communicates with the management apparatus based on the determined management type.

Another embodiment of the present disclosure includes an information processing method for setting a communication path through which an electronic apparatus communicates with a management apparatus. The information processing method includes identifying a protocol supported by the electronic apparatus. The information processing method includes determining a management type based on the identified protocol. The information processing method includes setting the communication path based on the determined management type.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5A-1, FIG. 5A-2, and FIG. 5B are diagrams for describing specific examples of operation for setting a communication path, according to an embodiment of the present disclosure; and FIG. 6 is a sequence diagram illustrating a specific example of an operation for setting a communication path, according to an embodiment of the present disclosure.

Figure 1:
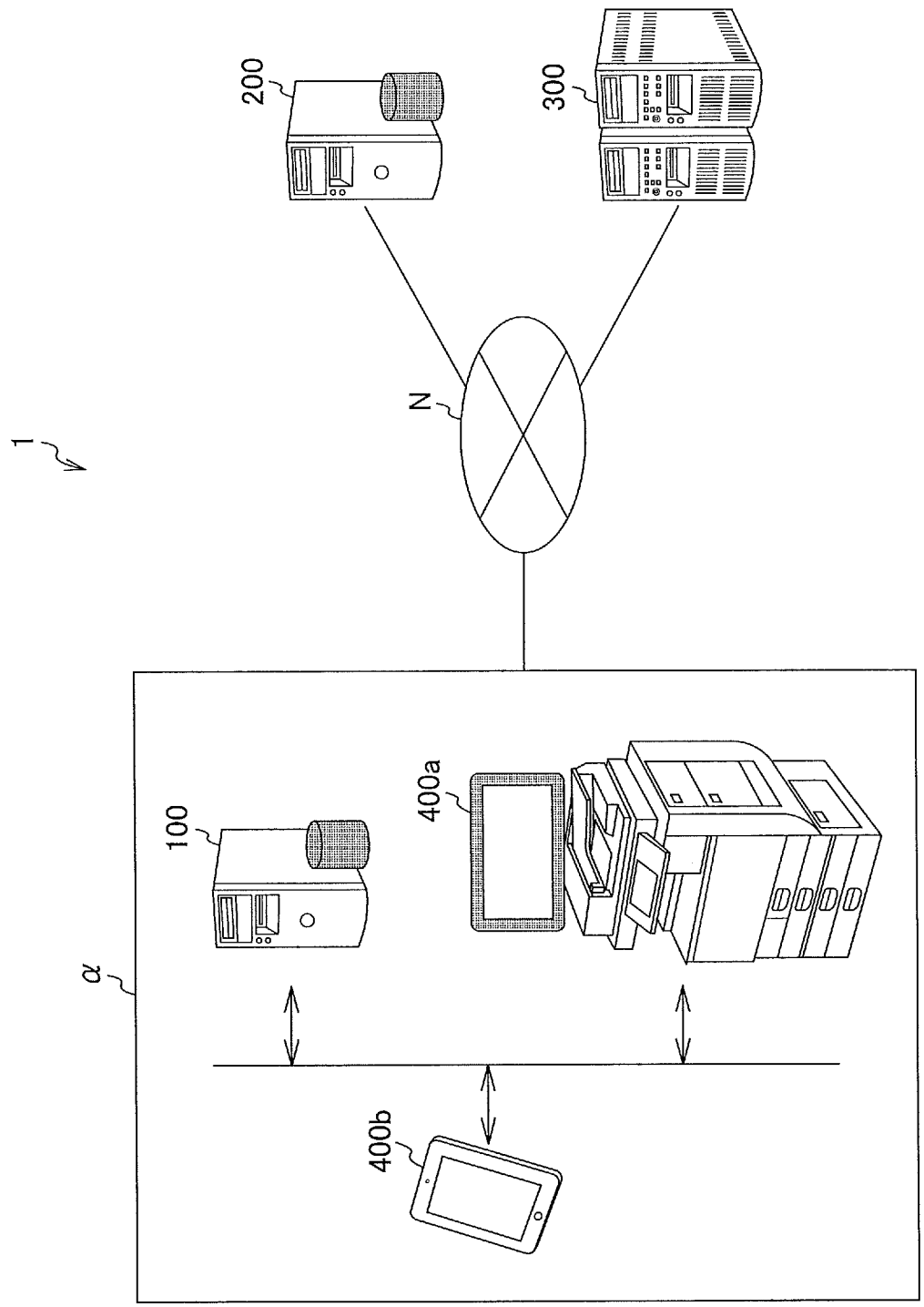
FIG. 1 is a diagram illustrating an example of a configuration of an information processing system, according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

FIG. 1 is a diagram illustrating an example of a configuration of an information processing system 1, according to an embodiment of the present disclosure. The information processing system 1 includes a server 100, a first management system 200, a second management system 300, multiple electronic apparatuses 400 including an electronic apparatus 400a and an electronic apparatus 400b. In the following description, any of the electronic apparatus 400a and the electronic apparatus 400b may be referred to as an "electronic apparatus 400", unless they need to be distinguished from each other. As illustrated in FIG. 1, among the elements of the information processing system 1, the server 100 and the electronic apparatuses 400 reside in an environment a. In one example, one or more of the apparatuses residing in the environment a is provided in different countries respectively.

The first management system 200 and the second management system 300 are configured to manage each of the electronic apparatuses 400 from a remote location. In the following description, the first management system 200 and the second management system 300 may be collectively referred to as a "management system". Specifically, the management system is communicable with each of electronic apparatuses 400 and stores various information for managing each of the electronic apparatuses 400. For example, the management system stores information indicating a type of each of the electronic apparatuses 400 managed by the management system. Examples of the type include, but are not limited to, an apparatus identifier (ID). FIG. 1 illustrates a multifunction peripheral/product/printer (MFP) and a mobile computer as an example of the electronic apparatus 400 managed by the management system. In another example, any other suitable electronic apparatuses are employed as the electronic apparatuses 400.

As illustrated in FIG. 1, each of the electronic apparatuses 400 and the management system are communicable with each other through a network N. The electronic apparatuses 400 according to the present embodiment includes both the electronic apparatus 400 of an old model and the electronic apparatus 400 of a new model. The electronic apparatus 400 of an old model are managed by the first management system 200. The electronic apparatus 400 of a new model are managed by the second management system 300. For this reason, settings have to be configured so that the electronic apparatus 400 of an old model is communicable with the first management system 200 and the electronic apparatus 400 of a new model is communicable with the second management system 300. For example, in a case in which the number of the electronic apparatuses 400 is huge, there is a drawback the amount of work to be performed for configuring the settings becomes excessive.

To address such issue, the present embodiment is configured such that the server 100 sets a communication path for the electronic apparatus 400 to communicate with the management system. Specifically, the electronic apparatuses 400 in the environment a are communicable with the server 100. The server 100 automatically sets a communication path for each of the electronic apparatuses 400 to communicate with the management system. For example, the server 100 configures settings of the electronic apparatus 400 of an old model such that the electronic apparatus of an old model is communicable with the first management system 200. Further, the server 100 configures settings of the electronic apparatus 400 of a new model such that the electronic apparatus of the new model is communicable with the second management system 300. Details of the above configuration are described below.

Figure 2:
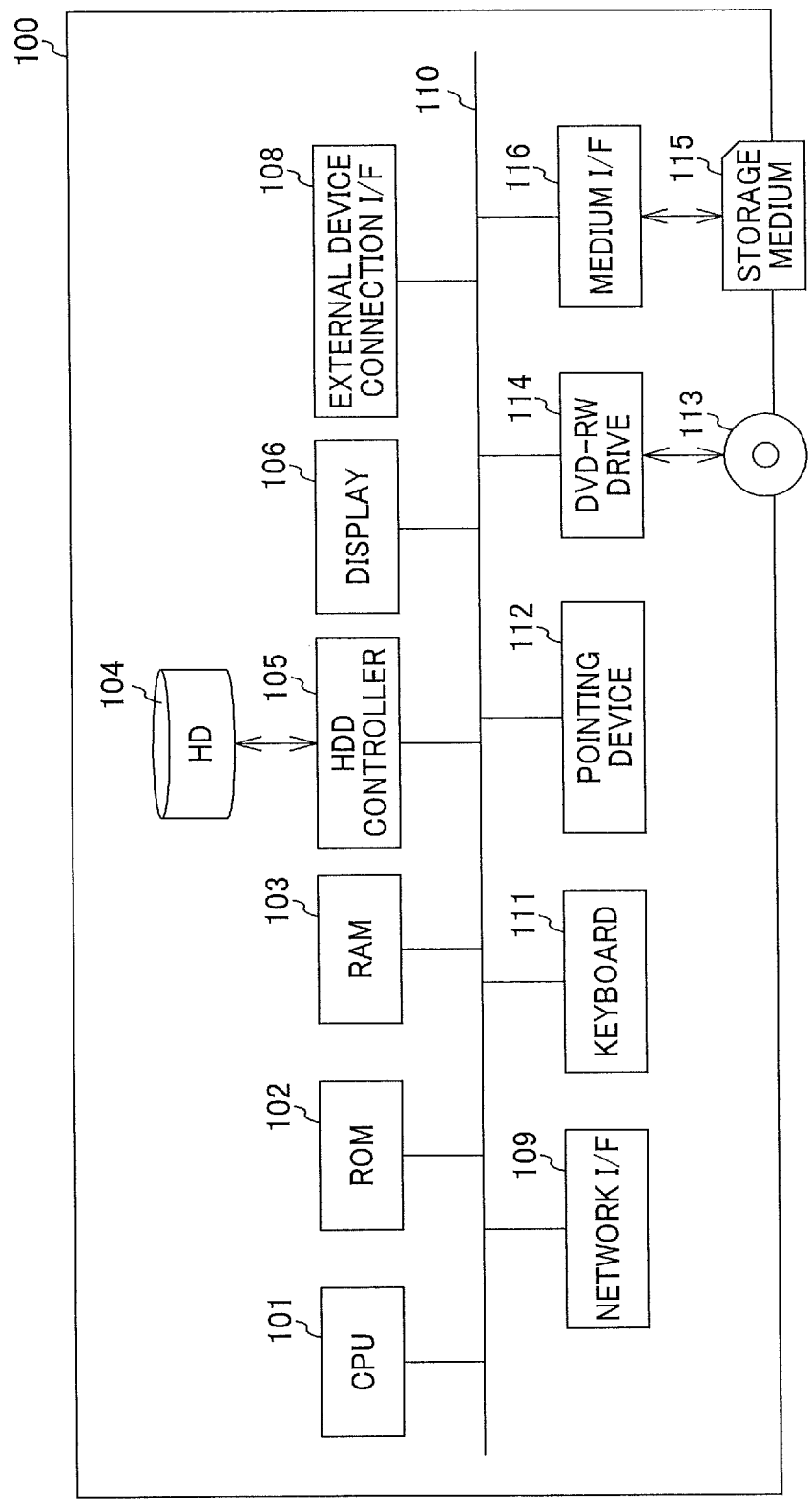
FIG. 2 is a block diagram illustrating an example of a hardware configuration of a server, according to an embodiment of the present disclosure.

FIG. 2 is a diagram illustrating an example of a hardware configuration of the server 100. As illustrated in FIG. 2, the server is configured by a computer, which includes a central processing unit (CPU) 101, a read only memory (ROM) 102, a random access memory (RAM) 103, a hard disk (HD) 104, a hard disk drive (HDD) controller 105, a display 106, an external device connection interface (I/F) 108, a network I/F 109, a bus line 110, a keyboard 111, a pointing device 112, a digital versatile disk rewritable (DVD-RW) drive 114 and a medium I/F 116.

The CPU 101 controls overall operation of the server 100. The ROM 102 stores a program such as an initial program loader (IPL) to boot the CPU 101. The RAM 103 is used as a work area for the CPU 101. The HD 104 stores various data such as a program. The HDD controller 105 controls reading or writing of various data from or to the HD 104 under control by the CPU 101.

The display 106 displays various information such as a cursor, menu, window, characters, or image. The external device connection I/F 108 is an interface that connects the server 100 to various external devices. Examples of the external devices include, but are not limited to, a universal serial bus (USB) memory and printer. The network I/F 109 is an interface that enables the server 100 to perform data communication through a communication network. Examples of the bus line 110 include, but are not limited to, an address bus and a data bus, which electrically connects the elements such as the CPU 101 with each other.

The keyboard 111 is an example of an input device provided with a plurality of keys that allows a user to input characters, numerals, or various instructions. The pointing device 112 is an example of an input device that allows a user to select or execute a specific instruction, select an object for processing, or move a cursor being displayed. The DVD-RW drive 114 controls reading or writing of various data from or to a DVD-RW 113, which is an example of a removable storage medium. The DVD-RW is merely one example of the removable storage medium. In another example, a DVD-recordable (DVD-R) is used as the removable storage medium. The medium I/F 116 controls reading or writing of data from or to a storage medium 115 such as a flash memory.

Figure 3:
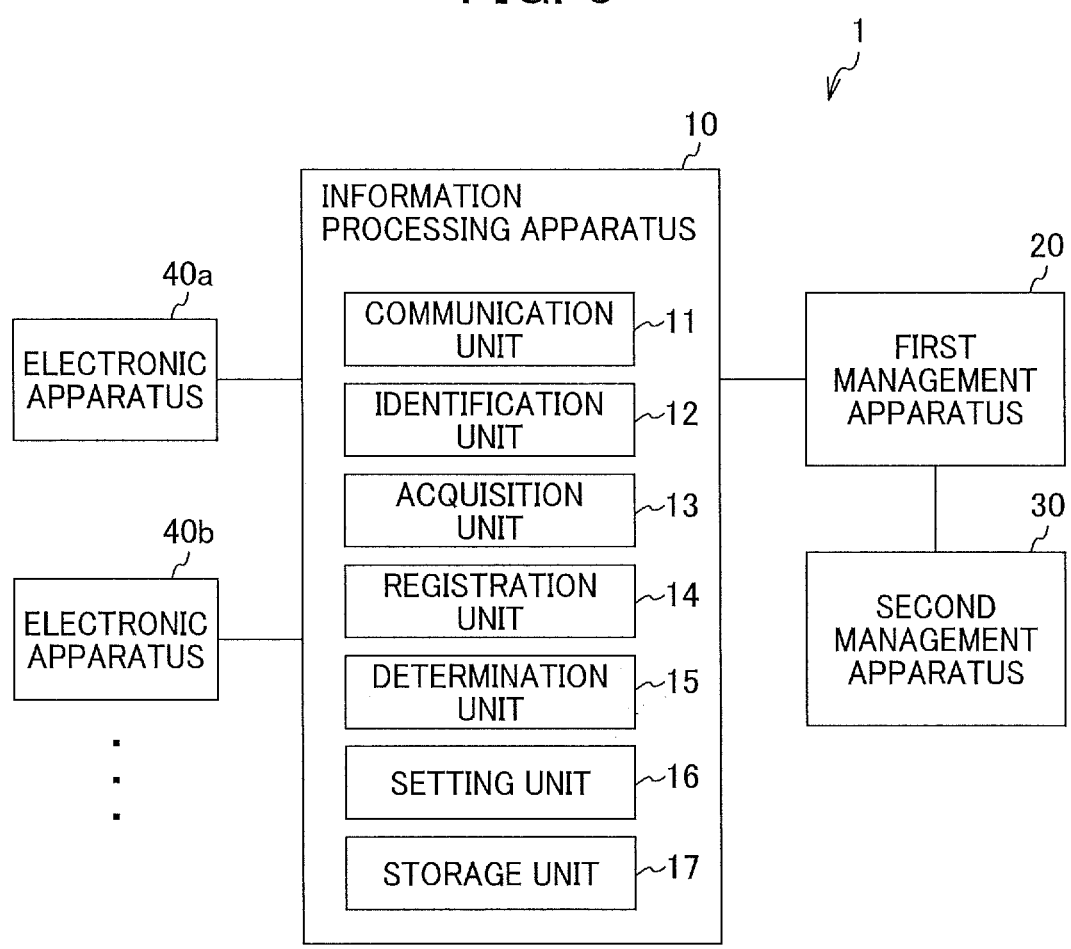
FIG. 3 is a block diagram illustrating an example of a functional configuration of the information processing system, according to an embodiment of the present disclosure.

FIG. 3 is a block diagram illustrating an example of a functional configuration of the information processing system 1. As illustrated in FIG. 3, the information processing system 1 includes an information processing apparatus 10, a first management apparatus 20, a second management apparatus 30, and multiple electronic apparatuses 40 including an electronic apparatus 40a and an electronic apparatus 40b. In the following description, any of the electronic apparatus 40a and the electronic apparatus 40b may be referred to as an "electronic apparatus 40", unless they need to be distinguished from each other. For example, the server 100 functions as the information processing apparatus 10 by executing the program by the CPU 101. The first management apparatus 20 is implemented by a CPU of the first management system 200 executing a program. The second management apparatus 30 is implemented by a CPU of the second management system 300 executing a program. In substantially the same manner, the electronic apparatus 40 is implemented by a CPU of the electronic apparatus 400 executing a program.

Each of the electronic apparatuses 40 are communicable with extraneous sources such as the information processing apparatus 10 in accordance with a protocol supported by the electronic apparatus 40. However, in some cases, the electronic apparatuses 40 supports different protocols respectively depending on types of the electronic apparatuses. Specifically, the electronic apparatuses 40 support any of protocols including a first protocol, a second protocol, and a third protocol. The first protocol is, for example, Hyper Text Transfer Protocol (HTTP). The second protocol is, for example, Simple Network Management Protocol (SNMP). The third protocol is, for example, Message Queuing Telemetry Transport (MQTT). The above protocols are merely example, and in another example, any other suitable protocols are adopted as the first protocol to the third protocol.

The first management apparatus 20 and the second management apparatus 30 are communicable with any of the electronic apparatuses 40, and have a function of managing the electronic apparatuses 40. In the following description, the first management apparatus 20 and the second management apparatus 30 may be collectively referred to as a "management apparatus". Although the description given above is of an example in which two types of management apparatuses are provided, in another example, one type of management apparatus is provided. In still another example, three or more types of management apparatuses are provided.

The management apparatus communicates with the electronic apparatus 40 through a communication path in which the information processing apparatus 10 intervenes between the electronic apparatus and the management apparatus or a communication path in which the information processing apparatus 10 does not intervene between the electronic apparatus and the management apparatus. The details are described below. The management apparatus is communicable with extraneous sources using a protocol supported by the management apparatus. However, the first management apparatus 20 and the second management apparatus 30 support different protocols respectively. Specifically, the first management apparatus 20 supports the first protocol, and the second management apparatus 30 supports the third protocol.

The information processing apparatus 10 functions as a relay device when a specific electronic apparatus 40 communicates with the management apparatus. For example, the electronic apparatus 40 that does not support any of the protocols (the first protocol and the third protocol) supported by the management apparatus is assumed. Such the electronic apparatus 40 cannot directly communicate with the management apparatus. However, such the electronic apparatus 40 is communicable with the management apparatus via the information processing apparatus 10. By contrast, the electronic apparatus 40 that supports the first protocol is communicable with the first management apparatus 20 without the information processing apparatus 10. However, in one example, the information processing apparatus 10 is configured to mediate communication between the electronic apparatus 40 that supports the first protocol and the management apparatus. The electronic apparatus 40 that supports the third protocol is communicable with the second management apparatus 30 without the information processing apparatus 10.

In the above configuration, settings of a communication path for the electronic apparatus 40 to communicate with the management apparatus have to be configured appropriately depending on a protocol supported by the electronic apparatus 40. In a comparative example, an operator has to manually configure settings of the communication path for the electronic apparatus 40 in consideration of a protocol supported by the electronic apparatus 40. In the comparative example, there is inconvenience that the amount of work for configuring settings of the communication path for the electronic apparatus 40 is likely to be excessive. Such the inconvenience is likely to become apparent when the number of electronic apparatus 40 is large. To address such issue, the present embodiment employs a configuration that eliminates or suppresses the inconvenience described above. The above configuration is described below in detail.

As illustrated in FIG. 3, the information processing apparatus 10 includes a communication unit 11, an identification unit 12, an acquisition unit 13, a registration unit 14, a determination unit 15, a setting unit 16, and a storage unit 17. The communication unit 11 is communicable with the electronic apparatus 40 using a plurality of types of protocols. Specifically, the communication unit 11 is communicable with the electronic apparatus 40 using protocols including the first protocol and the second protocol. Further, the information processing apparatus 10 (communication unit 11) is communicable with the first management apparatus 20 using the first protocol, to mediate communication between the electronic apparatus 40 and the first management apparatus 20.

The identification unit 12 identifies a protocol supported by the electronic apparatus 40. Specifically, as described above, the information processing apparatus 10 can perform communication using the first protocol and the second protocol. In the following description, the first protocol and the second protocol may be collectively referred to as a "search protocol", to simplify the description. The information processing apparatus 10 tries, for each of the search protocols, to access the electronic apparatus 40 using the search protocol. The search protocol using which communication with the electronic apparatus 40 is identified as a protocol supported by the electronic apparatus 40.

The acquisition unit 13 acquires, model information Dx indicating a type of the electronic apparatus 40 from each of the electronic apparatuses 40. The model information Dx includes, for example, a model ID, a media access control (MAC) address, a model name, and a vendor name of the electronic apparatus 40. In another example, the model information Dx includes any other suitable information. In the present embodiment, the third protocol is not included in the search program. The information processing apparatus 10 refers to the model information Dx acquired from the electronic apparatus 40 and determines whether the electronic apparatus 40 supports the third protocol. In another example, the third protocol is included in the search program.

The registration unit 14 registers a plurality of pieces of model information Dx of the electronic apparatuses 40 including the electronic apparatus 40a and the electronic apparatus 40b in the management apparatus. Specifically, the model information Dx of the electronic apparatus 40 managed by the first management apparatus 20 is registered in the first management apparatus 20. Further, the model information Dx of the electronic apparatus 40 managed by the second management apparatus 30 is registered in the second management apparatus 30. The management apparatus manages the electronic apparatus 40 using the registered model information Dx.

The determination unit 15 determines a management type according to the protocol identified by the identification unit 12. In other words, the determination unit 15 determines a management type for the electronic apparatus 40 according to the protocol supported by the electronic apparatus 40. The information processing apparatus 10 determines a management type according to information (type and data amount) exchanged between the electronic apparatus 40 and the management apparatus in addition to the protocol supported by the electronic apparatus 40 (see FIG. 4). The details are described below.

In another example, the management type is determined regardless of the information exchanged between the electronic apparatus 40 and the management apparatus. The setting unit 16 sets a communication path for the electronic apparatus 40 to communicate with the management apparatus according to the management type determined by the determination unit 15. The storage unit 17 stores a management database DB (see FIG. 5B described below) including the determined management type. The communication unit 11 is implemented by, for example, the network I/F 109 operating under control of the CPU 101 executing the program. Each of the identification unit 12, the acquisition unit 13, the registration unit 14, the determination unit 15, and the setting unit 16 is implemented by, for example, the CPU 101 executing the program. The storage unit 17 is implemented by, for example, HD 104.

Figure 4:
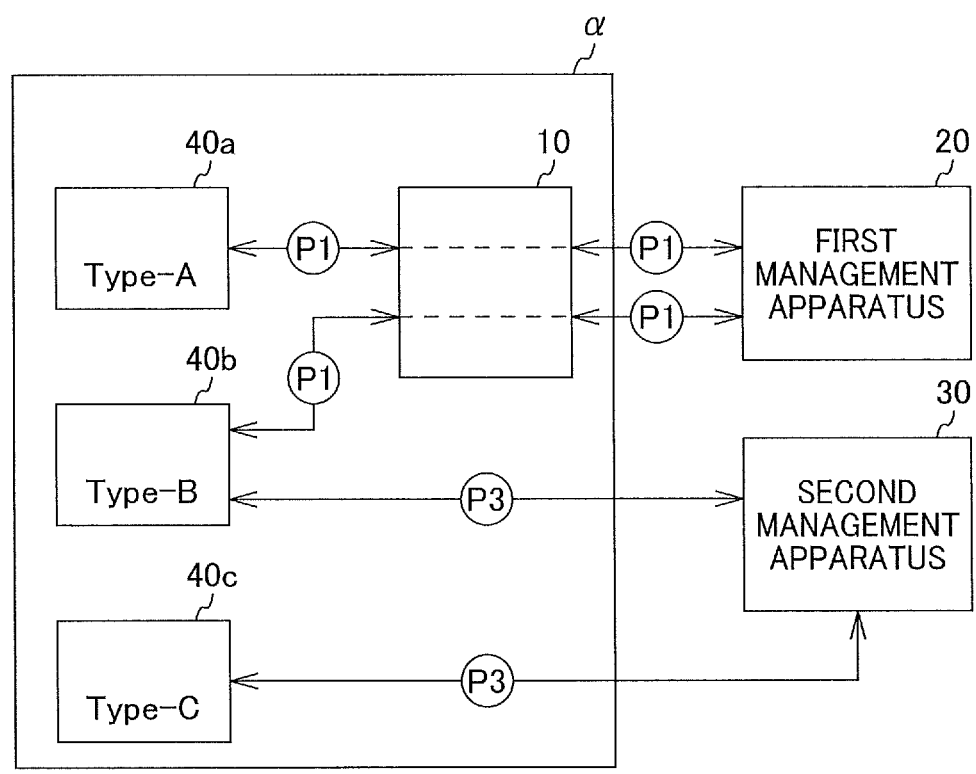
FIG. 4 is a diagram illustrating specific examples of communication paths for respective management types, according to an embodiment of the present disclosure.

FIG. 4 is a diagram illustrating specific examples of the communication paths for the respective management types. In FIG. 4, the electronic apparatus 40a, the electronic apparatus 40b, and the electronic apparatus 40c are illustrated among the electronic apparatuses 40. In FIG. 4, an arrow marked with a symbol "P1" indicates a communication path using the first protocol. An arrow marked with a symbol "P3" in FIG. 4 indicates a communication path using the third protocol. As described above, the first management apparatus 20 performs communication using the first protocol, and the second management apparatus 30 performs communication using the third protocol.

The information processing apparatus 10 determines any one of the management types A, the management type B, and the management type C according to a protocol supported by the electronic apparatus 40. For example, when the electronic apparatus 40 supports the first protocol and does not support the third protocol, the information processing apparatus 10 determines the management type A. The information processing apparatus 10 determines the management type according to information (type or data amount) communicated between the electronic apparatus 40 and the management apparatus. For example, the electronic apparatus 40 is assumed that transmits a request for consumables to the first management apparatus 20 when consumables such as ink of the MFP run out. The management type A is determined as a management type for such the electronic apparatus 40. Further, the management type A is determined as a management type for the electronic apparatus 40 that transmits counter information to the first management apparatus 20 once a day.

In the specific example of FIG. 4, it is assumed that the management type A is determined as a management type for the electronic apparatus 40a. In response to the determination of the management type A, the electronic apparatus 40 communicates with the first management apparatus 20. Specifically, the electronic apparatus 40 for which the management type A is determined communicates with the information processing apparatus 10 using the first protocol. The information processing apparatus 10 transmits information, such as a request for consumables or counter information, received from the electronic apparatus 40 to the first management apparatus 20 using the first protocol. In other words, the electronic apparatus 40 of the management type A communicates with the first management apparatus 20 via the information processing apparatus 10.

When the electronic apparatus 40 supports both the first protocol and the third protocol, the information processing apparatus 10 determines the management type B. Further, in a case that the electronic apparatus 40 transmits the request for consumables and/or the counter information to the first management apparatus 20 and transmits various information such as condition information to the second management apparatus 30 in real time, the information processing apparatus 10 determines the management type B.

In the specific example of FIG. 4, it is assumed that the management type B is determined as a management type for the electronic apparatus 40b. In response to the determination of the management type B, the electronic apparatus 40 communicates with the first management apparatus 20 and the second management apparatus 30. Specifically, the electronic apparatus 40 for which the management type B is determined communicates with the information processing apparatus 10 using the first protocol. The information processing apparatus 10 transmits information, such as the request for consumables or the counter information, received from the electronic apparatus 40 to the first management apparatus 20 using the first protocol. Further, the electronic apparatus 40 of the management type B transmits the information to the second management apparatus 30 in real time using the third protocol. In other words, the electronic apparatus 40 and the second management apparatus 30 are constantly connected with the third protocol.

As understood from the above description, the electronic apparatus 40 of the management type B communicates with the first management apparatus 20 via the information processing apparatus 10 and communicates with the second management apparatus 30 without intervening the information processing apparatus 10. It is assumed that the electronic apparatus 40 of management type B transmits and receives all information to and from the management apparatus via the information processing apparatus 10. In this case, inconvenience that an amount of data transmitted and received by the information processing apparatus 10 is excessive is likely to occur. Such inconvenience is likely to become apparent when various kinds of information are transmitted and received in real time. In the present embodiment, the electronic apparatus 40 of the management type B communicates with the management apparatus without intervening the information processing apparatus 10 when transmitting and receiving information in real time. This brings about an advantage that the inconvenience described above is reduced or eliminated.

When the electronic apparatus 40 does not support the first protocol and supports the second protocol and the third protocol, the information processing apparatus 10 determines the management type C. Further, the information processing apparatus 10 determines the management type C, in a case that the electronic apparatus 40 does not have to communicate with the first management apparatus 20. Examples of the case that the electronic apparatus 40 does not have to communicate with the first management apparatus 20 include, but are not limited to, a case that the second management apparatus 30 has a function of the first management apparatus 20 that the electronic apparatus 40 needs. In the specific example of FIG. 4, it is assumed that the management type C is determined for the electronic apparatus 40c. In response to the determination of the management type C, the electronic apparatus 40 communicates with the second management apparatus 30. Specifically, the electronic apparatus 40 for which the management type C is determined transmits information to the second management apparatus 30 in real time using the third protocol.

The above-described management types are merely examples, and, in another example, any other suitable management types are provided. For example, a management type is provided in which the electronic apparatus 40 directly communicates with the first management apparatus 20 (without intervening the information processing apparatus 10) using the first protocol and directly communicates with the second management apparatus 30 using the third protocol.

Figures 1, 5A:
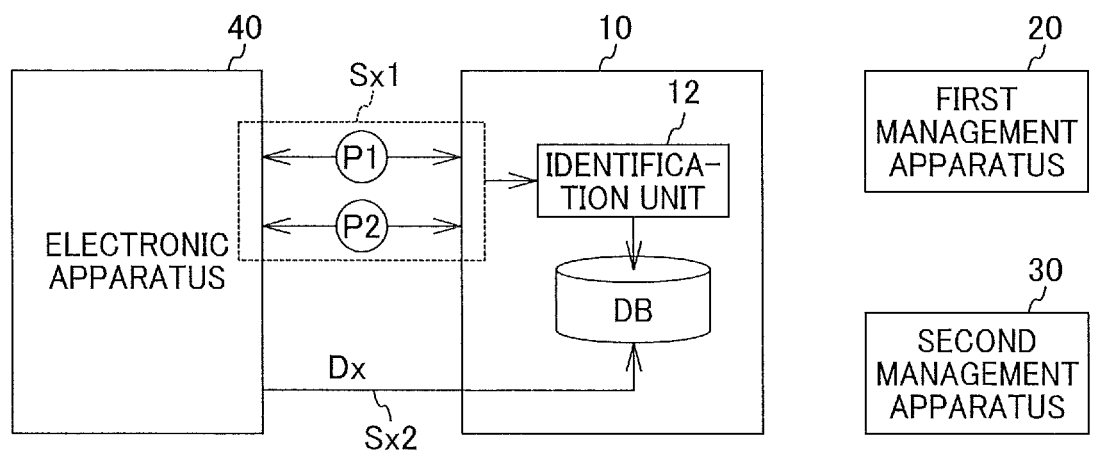
Figures 2, 5A:
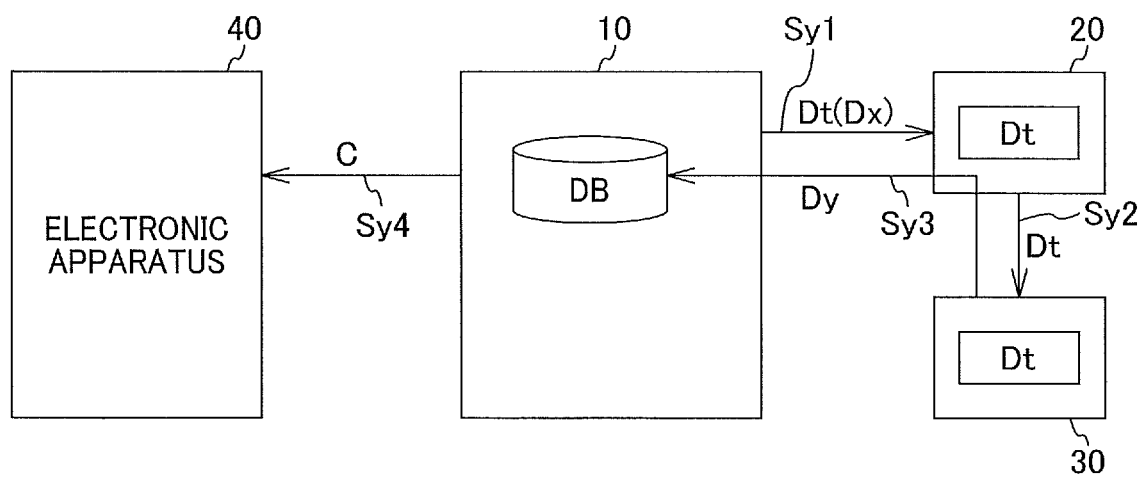

FIG. 5A-1 and FIG. 5A-2 are diagrams each illustrating a specific example of an operation for setting a communication path from the electronic apparatus 40 to the management apparatus. FIG. 5A-1 and FIG. 5A-2 illustrates steps (Sx, Sy) performed for setting a communication path for one electronic apparatus 40d. Actually, these steps are also performed on other electronic apparatuses 40 to set communication paths for other electronic apparatuses 40 respectively.

As described above, when setting a communication path from the electronic apparatus 40 to the management apparatus, the information processing apparatus 10 identifies a protocol supported by the electronic apparatus 40. Specifically, the information processing apparatus 10 tries, for each of the search protocols (P1 and P2), to access the electronic apparatus 40 using the search protocol (Sx1 in FIG. 5A-1). The information processing apparatus 10 determines, for each of the search protocols, whether the search protocol is supported by the electronic apparatus 40, depending on whether an access to the electronic apparatus 40 is successful.

One or more of the search protocols using which the information processing apparatus 10 succeeds in communicating with the electronic apparatus 40 is identified as a protocol supported by the electronic apparatus 40. Information indicating whether or not the search protocols are supported is registered in the management database DB (see FIG. 5B). In response to identifying the protocol supported by the electronic apparatus 40, the information processing apparatus 10 communicates with the electronic apparatus 40 using the identified protocol to acquire the model information Dx (Sx2 in FIG. 5A-1). The model information Dx is registered in the management database DB for each or the electronic apparatuses 40. Further, the information processing apparatus 10 refers to the model information Dx, to determine whether the electronic apparatus 40 supports the third protocol. Information indicating whether the electronic apparatus 40 supports the third protocol is registered in the management database DB for each of the electronic apparatuses 40.

As illustrated in FIG. 5A-2, the information processing apparatus 10 transmits registration information Dt to the first management apparatus 20 (Sy1 in FIG. 5A-2). The registration information Dt includes, for example, the model information Dx acquired from the electronic apparatus 40. The first management apparatus 20 registers (stores) the registration information Dt, and transmits the registration information Dt of the electronic apparatus 40 managed by the first management apparatus 20 to the second management apparatus 30 (Sy2 in FIG. 5A-2). In response to registering the registration information Dt, the second management apparatus 30 transmits transmission destination information Dy (Sy3 in FIG. 5A-2).

The transmission destination information Dy transmitted from the second management apparatus 30 includes, for example, information that specifies various settings such as proxy settings and the like for communication with the second management apparatus 30, a uniform resource locator (URL) group of the second management apparatus 30, and a certificate. The transmission destination information Dy is received by the information processing apparatus 10 via the first management apparatus 20. The information processing apparatus 10 updates the management database DB according to the transmission destination information Dy.

As described above, the information processing apparatus 10 determines the management types according to a protocol supported by the electronic apparatus 40, as describe above with reference to FIG. 4. In response to the determination of the management type, the information processing apparatus 10 transmits an instruction C corresponding to the determined management type to the electronic apparatus 40 (Sy4 in FIG. 5A-2). For example, it is assumed that a management type for the electronic apparatus 40 is the management type A. In this case, the information processing apparatus 10 transmits the instruction C including a URL required for communication with the information processing apparatus 10 to the electronic apparatus 40. In response to receiving the instruction C, the URL required for communication with the information processing apparatus 10 is set in the electronic apparatus 40. This enables the electronic apparatus 40 of the management type A to communicate with the first management apparatus 20 via the information processing apparatus 10.

Further, for example, it is assumed that a management type for the electronic apparatus 40 is the management type B. In this case, the information processing apparatus 10 transmits, to the electronic apparatus 40, the instruction C including an URL required for communication with the information processing apparatus 10 and transmission information Dy required for communication with the second management apparatus 30. In response to receiving the instruction C, the URL required for communication with the information processing apparatus 10 and the transmission information Dy required for communication with the second management apparatus 30 are set in the electronic apparatus 40. This enables the electronic apparatus 40 of the management type B to communicate with the first management apparatus 20 via the information processing apparatus 10 and directly communicate with the second management apparatus 30.

Furthermore, for example, it is assumed that a management type for the electronic apparatus 40 is the management type C. In this case, the information processing apparatus 10 transmits the instruction C including the transmission information Dy required for communication with the second management apparatus 30 to the electronic apparatus 40. In response to receiving the instruction C, the transmission information Dy required for communication with the second management apparatus 30 is set in the electronic apparatus 40. This enables the electronic apparatus 40 of the management type C to directly communicate with the second management apparatus 30.

FIG. 5B is a table illustrating an example of a data structure of the management database DB. The specific example of FIG. 5B illustrates the management database DB for which the registration of the protocol, the model information Dx, and the transmission destination information Dy corresponding to each of the electronic apparatuses 40 has been performed.

As illustrated in FIG. 5B, the management database DB includes, for each of the electronic apparatuses 40, a device ID, an Internet protocol (IP) address, a MAC address, a model name, and a vendor name. These information items are registered based on the model information Dx acquired from each of the electronic apparatuses 40. Further, in the management database DB, information indicating whether each of the first protocol to the third protocol is supported is stored for each of the electronic apparatuses 40. Furthermore, in the management database DB, a management type of the electronic apparatus 40 is stored for each of the electronic apparatuses 40. Furthermore, in the management database DB, the communication destination required for communication with the second management apparatus 30 is stored for each of the electronic apparatuses 40. These communication destinations are registered based on the communication destination information Dy described above.

FIG. 6 is a sequence diagram illustrating a specific example of an operation performed by the information processing apparatus 10. In response to receiving an input of a setting instruction for setting a communication path of an electronic apparatus (step S1), the information processing apparatus 10 sets the search protocols (step S2). The setting instruction is automatically input, for example, when the electronic apparatus 40 newly becomes communicable with the information processing apparatus 10. In another example, the setting instruction is input from the electronic apparatus 40 to the information processing apparatus 10 in response to any suitable operation to the electronic apparatus 40. In still another example, processes of step S2 and subsequent steps are performed in response to any suitable operation to the information processing apparatus 10.

After the setting of the search protocols, the information processing apparatus 10 accesses the electronic apparatus 40a using the search protocols (step S3a). Next, the information processing apparatus 10 performs an identification process (step S4a). In the identification process, the information processing apparatus 10 identifies a protocol supported by the electronic apparatus 40a based on whether the information processing apparatus succeeds in accessing the electronic apparatus 40a in the step S3a. The information processing apparatus 10 transmits a request instruction for the model information Dx to the electronic apparatus 40a using the protocol identified in the identification process (step S5a). In response to receiving the request instruction, the electronic apparatus 40a transmits the model information Dx to the information processing apparatus 10 (step S6a). The information processing apparatus 10 updates the management database DB to reflect the model information Dx transmitted in step S6a.

The information processing apparatus 10 performs the processes of the steps S3a to step S6a performed on the electronic apparatus 40a on the electronic apparatuses 40 other than the electronic apparatus 40a. In FIG. 6, it is assumed that processes of step S3b to step S6b are performed on the electronic apparatus 40b (a part of the electronic apparatuses 40 other than the electronic apparatus 40a). The information processing apparatus 10 performs the processes of the above steps on all of the electronic apparatuses 40. Then, the operation proceeds to a determination process of step S7.

In the determination process, the information processing apparatus 10 determines a management type for each of the electronic apparatuses 40. Specifically, in the determination process, the information processing apparatus 10 determines a management type for the electronic apparatus 40 according to the protocol supported by the corresponding electronic apparatus 40. After performing the determination process, the information processing apparatus 10 transmits instructions including an instruction Ca and an instruction Cb, each instructions instructing to set a communication path, to the electronic apparatuses 40 respectively (steps S8a, S8b . . . ). In another example, the timing at which each of the processes is performed is changed as appropriate.

Note that the apparatus that performs each of the above processes may be appropriately changed. Each of the above-described functions such as the communication unit 11 is implemented by, for example, one or more processing circuits or circuitry. Processing circuitry in this disclosure includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The apparatuses or devices described in each embodiment are merely one example of multiple computing environments that implement one or more embodiments disclosed herein. In some embodiments, information processing apparatus 10 includes multiple computing devices, such as a server cluster. The multiple computing devices communicate with one another through any type of communication link including, for example, a network or a shared memory, and performs the operations described in the present disclosure. In substantially the same manner, for example, the management apparatus includes such multiple computing devices configured to communicate with one another. In another example, each element of the information processing apparatus 10 and the management apparatus is integrated into one server apparatus or is divided into a plurality of devices.

Variation:

The above embodiments are variously modified. Specific modifications are described below. Any two or more aspects selected from the following examples may be appropriately combined.

(1) In one example, the information processing apparatus 10 changes a communication path between the electronic apparatus 40 and the management apparatus (a management type of the electronic apparatus 40) according to a status of the electronic apparatus 40. For example, when an amount of information transmitted from the electronic apparatus 40 to the management apparatus is smaller than a predetermined threshold value, the electronic apparatus 40 communicates with the management apparatus via the information processing apparatus 10. By contrast, for example, when the amount of information transmitted from the electronic apparatus 40 to the management apparatus is larger than a predetermined threshold value, the electronic apparatus 40 communicates with the management apparatus intervening the information processing apparatus 10.

(2) In one example, the management type of the electronic apparatus 40 is designated by appropriately operating an apparatus external to the information processing apparatus 10. Examples of the apparatus external to the information processing apparatus 10 include, but are not limited to, the electronic apparatus 40 and the management apparatus. In this example, the designated management type is registered in the information processing apparatus 10, and the information processing apparatus 10 sets a communication path for the electronic apparatus 40 to communicate with the management apparatus according to the registered management type.

The embodiments described above are examples, and aspects of the present disclosure attain effects and advantages as described below. First Aspect:

An information processing apparatus (10) according to a first aspect includes a communication unit (11) configured to communicate with an electronic apparatus (40) according to a plurality of protocols, an identification unit (12) configured to identify a protocol supported by the electronic apparatus, a determination unit (15) configured to determine a management type based on the protocol identified by the identification unit, and a setting unit (16) configured to set a communication path through which the electronic apparatus to communicate with a management apparatus (20, 30) based on the management type determined by the determination unit. According to the first aspect, a protocol that the electronic apparatus supports is identified, and a communication path through which the electronic apparatus communicates with the management apparatus is set based on the identified protocol. Accordingly, an amount of work for setting the communication path is reduced.

Second Aspect and Third Aspect:

In the information processing apparatus (10) according to a second aspect, the communication unit is configured to mediate communication between the electronic apparatus and the management apparatus, and the setting unit is configured to set the communication path through which the electronic apparatus and the management apparatus communicate with each other via the information processing apparatus. In the information processing apparatus (10) according to a third aspect, the setting unit is configured to set the communication path through which the electronic apparatus and the management apparatus communicate with each other without intervening the information processing apparatus. According to the second aspect and the third aspect, for example, compared to a configuration in which only a communication path through which the electronic apparatus and the management apparatus communicate with each other via the information processing apparatus 10 is set as a communication path through which the electronic apparatus communicates with the management apparatus, or a configuration in which only a communication path through which the electronic apparatus and the management apparatus communicate with each other without intervening the information processing apparatus 10 is set as the communication path, it is easier to set an appropriate communication path through which the electronic apparatus communicates with the management apparatus.

Fourth Aspect:

The information processing apparatus (10) according to a fourth aspect includes an acquisition unit (13) configured to acquire model information indicating a type of the electronic apparatus from a plurality of electronic apparatuses including the electronic apparatus, and a registration unit (14) configured to register the model information of the plurality of electronic apparatuses in the management apparatus. In other words, in the above configuration, the information processing apparatus has both a function of setting the communication path through which the electronic apparatus communicates with the management apparatus and a function of registering the model information in the management apparatus. This brings about an advantage that the number of apparatus is reduced as compared with a configuration in which different apparatuses having the functions respectively are provided.

Fifth Aspect:

The information processing system (1) according to a fifth aspect includes an information processing apparatus and a management apparatus communicable with an electronic apparatus. The information processing apparatus includes a communication unit configured to communicate with the electronic apparatus according to a plurality of protocols, an identification unit configured to identify a protocol supported by the electronic apparatus, a determination unit configured to determine a management type based on the protocol identified by the identification unit, and a setting unit configured to set a communication path through which the electronic apparatus to communicate with a management apparatus based on the management type determined by the determination unit. According to the fifth aspect, the same effect as in the first aspect is obtained.

Sixth Aspect:

An information processing method according to a sixth aspect is an information processing method for setting a communication path through which an electronic apparatus communicates with a management apparatus. The method includes identifying (S4a and S4b in FIG. 6) a protocol supported by the electronic apparatus, determining (S7 in FIG. 6) a management type based on the identified protocol, and setting (S8a and S8b in FIG. 6) the communication path based on the determined management type. According to the sixth aspect, the same effect as in the first aspect is obtained.

Seventh Aspect:

A program according to a seventh aspect is a program that causes a computer to execute the information processing method of the sixth aspect. According to the seventh aspect, the same effect as in the first aspect is obtained.

According to one or more embodiments of the present disclosure, a protocol that an electronic apparatus supports is identified, and a communication path through which the electronic apparatus communicates with a management apparatus is set based on the identified protocol. Accordingly, an amount of work for setting the communication path is reduced or the work for setting the communication path is eliminated.

According to one or more embodiments, a non-transitory computer-executable medium storing a plurality of instruction is provided, that when executed one or more processors, cause the one or more processors to perform a method for setting a communication path through which an electronic apparatus communicates with a management apparatus. The method includes identifying a protocol supported by the electronic apparatus. The method includes determining a management type based on the identified protocol. The method includes setting the communication path based on the determined management type.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An information processing apparatus communicable with an electronic apparatus according to a plurality of protocols, the information processing apparatus comprising:
   circuitry configured to:
      identify a particular protocol supported by the electronic apparatus among the plurality of protocols;
      determine a management type based on the identified particular protocol;
      set, based on the determined management type, a communication path through which the electronic apparatus communicates with a first management apparatus among a plurality of management apparatuses that communicate according to respective different protocols; and
      mediate communication between the electronic apparatus and the management apparatus, wherein the communication path set by the circuitry is a first communication path through which the electronic apparatus communicates with the first management apparatus via the information processing apparatus or a second communication path through which the electronic apparatus communicates with the first management apparatus without intervening the information processing apparatus, and wherein the circuitry is configured to:
determine, for each one of the different protocols, whether the identified protocol of the electronic apparatus matches one of the different protocols, and
set the first management path or the second management path associated with the management type, based on a result of the determination.

2. The information processing apparatus of claim 1, wherein the circuitry is configured to
acquire a plurality of pieces of model information respectively from a plurality of electronic apparatuses including the electronic apparatus, the plurality of pieces of model information respectively indicating types of the plurality of electronic apparatuses, and
register the plurality of pieces of model information of the plurality of electronic apparatuses in each management apparatus.

3. An information processing system comprising:
an information processing apparatus; and
a plurality of management apparatuses configured to communicate with an electronic apparatus,
the information processing apparatus being communicable with the electronic apparatus according to a plurality of protocols and including circuitry, the circuitry being configured to
identify a particular protocol supported by the electronic apparatus among the plurality of protocols;
determine a management type based on the identified particular protocol;
set, based on the determined management type, a communication path through which the electronic apparatus communicates with a first management apparatus among the plurality of management apparatuses; and
mediate communication between the electronic apparatus and the first management apparatus,
wherein the communication path set by the circuitry is a first communication path through which the electronic apparatus communicates with the first management apparatus via the information processing apparatus or a second communication path through which the electronic apparatus communicates with the first management apparatus without intervening the information processing apparatus, wherein the plurality of management apparatuses are configured to communicate according to respective different protocols, wherein the circuitry is configured to:
determine, for each one of the different protocols, whether the identified protocol of the electronic apparatus matches one of the different protocols, and
set the first management path or the second management path associated with the management type, based on a result of the determination.

4. An information processing method comprising:
identifying a protocol supported by the electronic apparatus;
determining a management type based on the identified protocol;
setting, based on the determined management type, a communication path through which an electronic apparatus communicates with a first management apparatus among a plurality of management apparatuses that communicate according to respective different protocols; and
mediating communication between the electronic apparatus and the first management apparatus,
wherein the set communication path is a first communication path through which the electronic apparatus communicates with the first management apparatus via an information processing apparatus or a second communication path through which the electronic apparatus communicates with the first management apparatus without intervening the information processing apparatus,
wherein the determining of the management type includes determining, for each one of the different protocols, whether the identified protocol of the electronic apparatus matches one of the different protocols, and
wherein the setting of the communication path includes setting the first management path or the second management path associated with the management type, based on a result of determining, for each one of the different protocols, whether the identified protocol of the electronic apparatus matches one of the different protocols.

* * * * *